United States Patent
Bhat et al.

(10) Patent No.: US 12,210,542 B1
(45) Date of Patent: Jan. 28, 2025

(54) CONFIGURATION-DRIVEN EFFICIENT TRANSFORMATION OF FORMATS AND OBJECT STRUCTURES FOR DATA SPECIFICATIONS IN COMPUTING SERVICES

(71) Applicant: PAYPAL, INC., San Jose, CA (US)

(72) Inventors: Rajendra Bhat, Bangalore Urban (IN); Prabin Patodia, Bangalore (IN)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 18/539,099

(22) Filed: Dec. 13, 2023

(51) Int. Cl.
*G06F 16/25* (2019.01)
*G06N 20/00* (2019.01)
*G06Q 20/40* (2012.01)

(52) U.S. Cl.
CPC ........... *G06F 16/258* (2019.01); *G06N 20/00* (2019.01); *G06Q 20/4016* (2013.01)

(58) Field of Classification Search
CPC ... G06F 16/258; G06N 20/00; G06Q 20/4016
See application file for complete search history.

(56) References Cited

U.S. PATENT DOCUMENTS

| | | | | |
|---|---|---|---|---|
| 7,120,703 | B2 * | 10/2006 | Li | G06F 16/84 |
| | | | | 707/E17.118 |
| 7,644,184 | B2 * | 1/2010 | Arora | H04L 69/08 |
| | | | | 709/212 |
| 10,083,215 | B2 * | 9/2018 | Davis Jones | G06F 16/258 |
| 11,074,261 | B1 * | 7/2021 | Pandis | G06F 16/9535 |
| 11,971,901 | B1 * | 4/2024 | Goodsitt | G06F 3/0481 |
| 2018/0137106 | A1 * | 5/2018 | Platek | G06F 40/242 |
| 2019/0050222 | A1 * | 2/2019 | Hua | G06F 8/74 |
| 2020/0241849 | A1 * | 7/2020 | Marthala | G06F 8/34 |
| 2020/0344297 | A1 * | 10/2020 | Agarwal | G06N 20/00 |
| 2022/0222572 | A1 * | 7/2022 | Fry | G16Y 40/20 |
| 2022/0222574 | A1 * | 7/2022 | Fry | G06F 16/258 |
| 2022/0277230 | A1 * | 9/2022 | Capelo | G06N 20/00 |
| 2022/0327119 | A1 * | 10/2022 | Gasper | G06F 16/9024 |
| 2024/0061858 | A1 * | 2/2024 | Guttula | G06F 16/258 |
| 2024/0161015 | A1 * | 5/2024 | Patel | G06N 20/20 |
| 2024/0256534 | A1 * | 8/2024 | Alexander | G06F 16/24522 |
| 2024/0264988 | A1 * | 8/2024 | Macneill | G06F 16/215 |

* cited by examiner

*Primary Examiner* — Jorge A Casanova
(74) *Attorney, Agent, or Firm* — Haynes and Boone, LLP

(57) ABSTRACT

There are provided systems and methods for configuration-driven efficient transformation of formats and object structures for data specifications in computing services. A service provider, such as an electronic transaction processor for digital transactions, may utilize different computing services that implement rules and artificial intelligence models for decision-making of data including data in production computing environment. Different services may process data in different data formats and structures. However, transformation of data between different services, such as a gateway service that may receive data processing requests and/or data objects and downstream services that may process such requests and objects, may take significant time and resources. A configuration-driven data transformation platform may intelligently create code for and select from transformers that may be used for data transformations. When selected, the transformers may transform data between services faster and more efficiently by being specifically selected based on past performances and code configurations.

20 Claims, 6 Drawing Sheets

CONFIGURATION-DRIVEN EFFICIENT TRANSFORMATION OF FORMATS AND OBJECT STRUCTURES FOR DATA SPECIFICATIONS IN COMPUTING SERVICES

TECHNICAL FIELD

The present application generally relates to data transformers and different data formats, and more particularly to providing an artificial intelligence (AI) system to intelligently generate, configure, and select data transformers for data transformation for data formats and object structures between computing services.

BACKGROUND

Online service providers may offer various services to end users, merchants, and other entities. This may include providing electronic transaction processing data flows, services, and other computing resources. Further, the service provider may provide and/or facilitate the use of online merchant marketplaces and/or transaction processing between different entities. When providing these computing services, the service provider may utilize various processes, which may correspond to decision services, micro-computing services, and other components of an application and system architecture that include rules-based and/or machine learning (ML)-based engines, computing nodes, execution paths, and the like to process data requests. Generally, requests from clients and computing devices of users may be received at a gateway service that acts as an entry point for a group of services, where the gateway service may be responsible for orchestrating and calling all the dependent services that are invoked for a specific request.

During this orchestration process, each request and response between different services may be required to be transformed from one format to another format, and this may occur multiple times depending on the computing services or processes used. When transforming data, object structure of requests/responses is complex and transforming from one format to another format may therefore take significant amounts of time. This can further take considerable processing resources and power, which contributes to the higher service level agreement (SLA) times for data calls and higher central processing unit (CPU) processing at the gateway layer. As such, it is desirable to determine and provide transformations of data for formats and object structures in a more efficient manner and with less processing resource usage.

Figure 1:
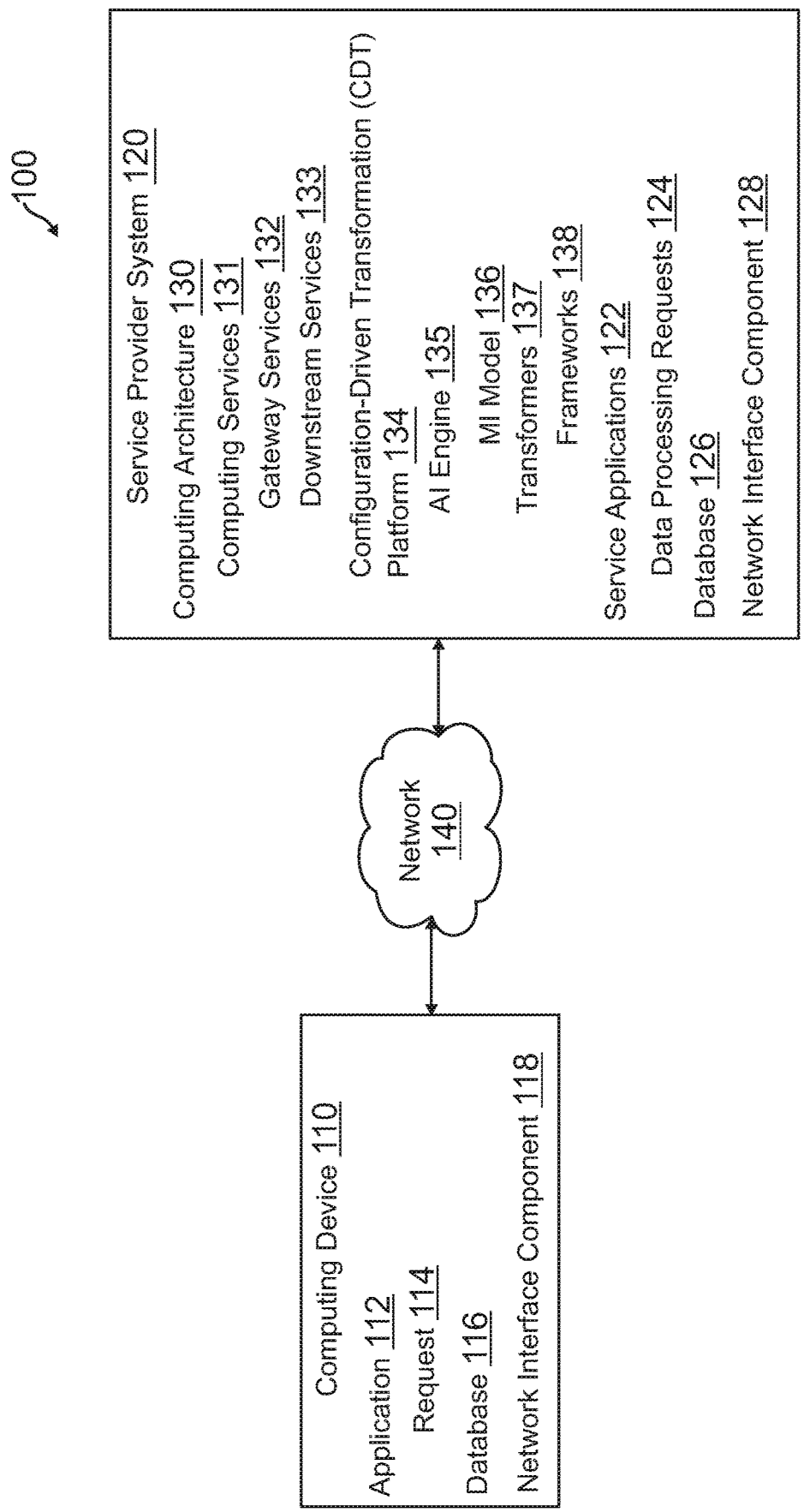
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for configuration-driven efficient transformation of formats and object structures for data specifications in computing services. Systems suitable for practicing methods of the present disclosure are also provided.

A user may utilize a client to interact with an online service provider, such as by using a computing device with an application or website to interact with a computing architecture and the different computing services of the application, platform, and system of the service provider. A service provider may provide different computing resources and services to users through different websites, resident applications (e.g., which may reside locally on a computing device), and/or other online platforms. When utilizing the services of a particular service provider, the service provider may provide decision services for implementing rules and intelligent decision-making operations with such services. Decisions services (e.g., microservices and/or other computing services for an application and computing architecture for one or more digital platforms and/or systems of the service provider) may, for example with an online transaction processor, provide services associated with electronic transaction processing, including account services, user authentication and verification, digital payments, risk analysis and compliance, and the like. These services may further implement automated and intelligent decision-making operations and engines, including data processing rule engines that automate decision-making based on rules designated for the systems.

These decision services may be used for risk analysis, fraud detection, and the like to determine if, when, and how a particular service may be provided to users. For example, risk rules may be utilized with a risk engine for a decision service to determine if an indication of fraud is present in a digital transaction or payment, and therefore to determine whether to proceed with processing the transaction or instead decline the transaction (as well as additional operations, such as request further authentication and/or information for better risk analysis). The user may provide data for a request, direct or indirect, to be processed, such as by creating, transmitting, and/or providing a data processing request to perform an activity, process data, and/or receive a response from the service provider's computing system and/or application(s). This may require use of different computing services, applications, and layers of the service provider. Processing of a request and the used services may be based on request and/or response specification of the computing architecture, application and/or upstream and all the downstream services that are called for a specific request. The data processing request may correspond to request code in a first format that may be required to be transformed to different, second request code in a second format.

As such, when clients (e.g., computing devices of users) connect with and/or call computing services of service providers, decision services may be invoked to execute strategies in a workflow of data processes for a particular request, call, or the like. However, to process such data, each service may need to utilize a particular data format and/or object structure for data loads and the like associated with the request (e.g., request data, input, loaded data from other services, application programming interface (API) calls and responses, etc.). As such, data transformations by a gateway layer and/or service, as well as other data orchestration layers and services for further downstream computing services, may take and consume considerable time and resources to orchestrate such data transformations to properly handle data between different services. For example, with a risk analysis and/or assessment gateway, around 60% of the total processing time may be spent on data transformations for different risk data from other endpoints, services, and API calls/responses. These transformations may therefore not be limited to gateway services, but also include other orchestration services and the like, such as payment processing services, service for data models to business object conversions, conversions between business objects and the like, or other services that typically convert and transform data.

In this regard, the service provider may provide one or more readily available libraries and/or frameworks to perform these conversions and data transformations. However, since the framework performance and throughput may vary based on object structure and data type used within the objects (e.g., -array objects,-list objects, and/or other complex structures), each framework may have a corresponding process and operations for transforming coding syntax and configurations. While some developers may use a single library to avoid code complexities without being concerned with performance impact, this may in turn incur high latency during data transformations. However, if a developer chooses multiple libraries based on data type, format, and/or object structures to achieve better performance (e.g., reducing latency by 25 to 30%), the developer and service provider may need more maintenance and development effort.

As discussed herein, the service provider may therefore provide a system for auto-generating transformer code that may use an optimized and/or "best" or most preferred and optimal transformer framework library for the specific data transformation, which may be selected based on performance factors, such as speed, processor usage, accuracy, cost, and the like. This may be done using an AI framework including one or more ML models and/or neural networks that may predictively generate computing code and configurations for transformers that may transform data from one format and/or object structures to another based on other "best performing" or most optimal transformers used with the same or similar data transformations, formats, and/or structures. Further, the AI framework may, after generating and/or updating the transformers, be used to intelligently select one or more transformers for the data transformation job or task being requested, such as for the specific request being processed at a gateway service or the like. Creating and/or updating the transformers, as well as selecting the transformers, may be based on API call and/or request and response specifications for different processing workflows and their corresponding services, as well as the best or most optimal transformers, code and operations, and transformations that may be used for converting and/or transforming the data between the services and their formats and/or object structures. The AI framework may therefore provide for faster and more efficient data transformations, reducing time for data transformations and processing resources, CPUs, machines, and the like used during transformation. This may further provide the flexibility of having multiple transformer library for a single specification conversion based on different use cases for the data and/or called services.

For example, a user may utilize online service providers, such as transaction processors, via their available online and networked platforms. For example, a user may make a payment to another user or otherwise transfer funds using the online platforms of the service providers. In this regard, a user may wish to process a transaction, such as for a payment to another user or a transfer. A user may pay for one or more transactions using a digital wallet or other account with an online service provider or transaction processor (e.g., PayPal®). An account may be established by providing account details, such as a login, password (or other authentication credential, such as a biometric fingerprint, retinal scan, etc.), and other account creation details. The account creation details may include identification information to establish the account, such as personal information for a user, business or merchant information for an entity, or other types of identification information including a name, address, and/or other information. The account and/or digital wallet may be loaded with funds or funds may otherwise be added to the account or digital wallet. The application or website of the service provider, such as PayPal® or other online payment provider, may provide payments and the other transaction processing services via the account and/or digital wallet.

Once the account and/or digital wallet of the user is established, the user may utilize the account via one or more computing devices, such as a personal computer, tablet computer, mobile smart phone, or the like. The user may engage in one or more transactions with a recipient, such as a recipient account or digital wallet that may receive an amount of a payment. When engaging in these interactions, the service provider may provide microservices and/or decision services that may be used to process data requests and provide a decision or other output, which may be used in conjunction to provide computing services to users. Services may include gateway services for incoming requests, as well as corresponding downstream processing services. The service provider may utilize an AI framework that provides auto-generator of transformer code using the best possible transformer framework library from past transformer performance and/or other metrics for optimized data transformations.

Using the AI framework, an AI recommendation may provide a similar or close match score for multiple transformers for the same set of specification transformations (e.g., the same request and response specification for a processing task or job of a request). In this case, the code generator of the AI framework may generate multiple transformer code, and, during request processing, a common transformer processor may evaluate all the transformers that have been automatically coded, generated, and/or updated to choose a best performing one. The common transformer processor may execute all matched transformers for set of requests, and depending on performance with respect to the incoming data, may then pick the best one for future and/or subsequent requests.

The AI framework may include a common transformer configuration that may be a user defined configuration for mapping of requests and responses. A transformer code generator may further be provided that may be responsible for generating transformer implementation code-based configurations for the requests and responses, as well as other selected parameters for transformer coding. The AI framework may use an endpoint configuration that provides an API orchestration graph for the orchestration of different services during request and/or response processing. A transformer implementation repository may include generated code that has been initialized and stored in a memory in the form of key-value pairs. For the AI framework, the common transformer processor may be responsible for choosing a performant transformer from the repository and executing the transformer when selected. Further, the AI framework may include one or more AI models, such as ML models and/or NNs, which may be trained to provide a best fit transformer framework library based on formats and data structures for services from the request and response specification. This data may be available from a transformer framework library.

As such, the service provider may provide more efficient data transformations of data processing requests and data loads between computing services and other decisioning operations for a data processing system. These transformations may be configuration-driven by data transformation specifications, libraries, and frameworks with API request and response specifications, making data transformer selection more intelligent and specific to each instance and request. Further, the faster and more efficient transformations decrease and/or prevent loss due to slow processing speeds or timeouts, which allow for more accuracy and greater confidence in data processing results and system requests. Moreover, the AI engine allows for transformer code and code libraries to be generated, updated, and configured for the most efficient transformations available.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, standalone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entity.

System 100 includes a computing device 110 and a service provider system 120 in communication over a network 140. Computing device 110 may be utilized by a user to access a computing service or resource provided by service provider system 120, where service provider system 120 may provide various data, operations, and other functions to computing device 110 via network 140 including those associated with applications and computing infrastructures that utilize decision and other computing services for decision-making and data processing. In this regard, computing device 110 may be used to access a website, application, or other platform that provides computing services. Service provider system 120 may provide computing services that process data and provide decisions in response to data processing requests via computing services, where service provider system 120 may transform data between services using an intelligent and configuration-driven platform or system for more efficient and faster data transformations.

Computing device 110 and service provider system 120 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 140.

Computing device 110 may be implemented as a communication device that may utilize appropriate hardware and software configured for wired and/or wireless communication with service provider system 120 and/or other devices or servers. For example, in one embodiment, computing device 110 may be implemented as a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data. Although only one device is shown, a plurality of devices may function similarly and/or be connected to provide the functionalities described herein.

Computing device 110 of FIG. 1 contains an application 112, a database 116, and a network interface component 118. Application 112 may correspond to executable processes, procedures, and/or applications with associated hardware. In other embodiments, computing device 110 may include additional or different modules having specialized hardware and/or software as required.

Application 112 may correspond to one or more processes to execute software modules and associated components of computing device 110 to provide features, services, and other operations for a user over network 140, which may include accessing and utilizing computing services provided by service provider system 120 including transmitting or providing a request 114, directly or indirectly (e.g., not a specific request, but an action that implies a request or otherwise indicates a response is needed for the action), to service provider system 120 for processing by service provider system 120. In this regard, application 112 may correspond to specialized software utilized by computing device 110 that may be used to access a website or application (e.g., mobile application, rich Internet application, or resident software application) that may display one or more user interfaces that allow for interaction with the computing services of service provider system 120. In various embodiments, application 112 may correspond to a general browser application configured to retrieve, present, and communicate information over the Internet (e.g., utilize resources on the World Wide Web) or a private network. For example, application 112 may provide a web browser, which may send and receive information over network 140, including retrieving website information, presenting the website information to the user, and/or communicating information to the website. However, in other embodiments, application 112 may include a dedicated application of service provider system 120 or other entity.

Application 112 may be associated with account information, user financial information, and/or transaction histories. However, different services may be provided via application 112, including social networking, media posting or sharing, microblogging, data browsing and searching, online shopping, and other services available through service provider system 120. Thus, application 112 may also correspond to different service applications and the like. When utilizing application 112 with service provider system 120, application 112 may request processing of a data processing request, such as by transmitting or providing request 114 for processing and/or providing data with request 114 to process the data and/or return a data processing result when utilizing one or more computing services of service provider system 120. Request 114 may correspond to account login, authentication, electronic transaction processing, and/or use of other services described herein. Request 114 may correspond to request code and have a corresponding data load that is processed via one or more decision services of service provider system 120 to provide a decision that is used to provide a resulting output and result. As such, application 112 may be used with the decision services of service provider system 120.

Computing device 110 may include other applications as may be desired in particular embodiments to provide features to computing device 110. For example, these other applications may include security applications for implementing client-side security features, programmatic client applications for interfacing with appropriate API over network 140, or other types of applications. Other applications on computing device 110 may also include email, texting, voice and IM applications that allow a user to send and receive emails, calls, texts, and other notifications through network 140. In various embodiments, the other applications may include financial applications, such as banking applications. Other applications may include social networking applications, media viewing, and/or merchant applications.

The other applications may also include other location detection applications, which may be used to determine a location for the user, such as a mapping, compass, and/or GPS application, which can include a specialized GPS receiver that determines location information for computing device 110. The other applications may include device interface applications and other display modules that may receive input from the user and/or output information to the user. For example, computing device 110 may contain software programs, executable by a processor, including a graphical user interface (GUI) configured to provide an interface to the user. The other applications may therefore use devices of computing device 110, such as display devices capable of displaying information to users and other output devices, including speakers.

Computing device 110 may further include database 116 stored on a transitory and/or non-transitory memory of computing device 110, which may store various applications and data and be utilized during execution of various modules of computing device 110. Database 116 may include, for example, identifiers such as operating system registry entries, cookies associated with application 112 and/or other applications, identifiers associated with hardware of computing device 110, or other appropriate identifiers, such as identifiers used for payment/user/device authentication or identification, which may be communicated as identifying the user/computing device 110 to service provider system 120. Moreover, database 116 may include data used for request 114, such as data that may be provided to service provider system 120 for processing request 114.

Computing device 110 includes at least one network interface component 118 adapted to communicate with service provider system 120 and/or another device or server. In various embodiments, network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Service provider system 120 may be maintained, for example, by an online service provider, which may provide computing services that utilize decision and microservices for decision-making in an intelligent system to provide responses, output, and/or results to computing device 110 based on data processing requests and corresponding request code. In this regard, service provider system 120 includes one or more processing applications which may be configured to interact with computing device 110 for data processing. In one example, service provider system 120 may be provided by PAYPAL®, Inc. of San Jose, CA, USA. However, in other embodiments, service provider system 120 may be maintained by or include another type of service provider.

Service provider system 120 of FIG. 1 includes computing services 131, a configuration-driven transformation (CDT) platform 134, service applications 122, a database 126, and a network interface component 128. Computing services 131, CDT platform 134, and service applications 122 may correspond to executable processes, procedures, and/or applications with associated hardware. In other embodiments, service provider system 120 may include additional or different modules having specialized hardware and/or software as required.

A computing architecture 130 of service provider system 120 may correspond to a framework, platform, or device/server system that may provide service applications 122 usable by customers and other users over network 140 for data processing and other online activities. In this regard, computing architecture 130 includes computing services 131 that may correspond to the different data processing services that are called during processing of different ones of data processing requests 124, for example, to provide a result or output used in the processing of the request and return of a response to a client. The clients may correspond to different ones of service applications 122 that may be invoked by computing device 110 for use, such as to process transactions electronically, create and/or utilize a digital account, and the like. For example, computing services 131 may include gateway services 132, such as API endpoints for requests and responses incoming from external devices and servers (e.g., computing device 110), as well as downstream services 133 that may provide real-time, batch, or other processing tasks and jobs for different requested computing operations and services (e.g., risk decisioning, fraud detection, authentication, transaction processing, compliance, messaging, etc.).

Computing services 131 may correspond to those used in the provision of service applications 122 to users, which may utilize the decision services, microservices, and the like provided through computing services 131 for real-time decisioning, data processing, and other computing operations provided by service applications 122. For example, gateway services 132 may be utilized to handle and orchestrate the processing of incoming data processing requests 124, such as request 114 from computing device 110. Thus, gateway services 132 may correspond to an orchestration layer or set of orchestrating services that manage routing and/or transmission of data to downstream services 133 for handling and processing based on data processing requests 124 and use of service applications 122. Together, gateway services 132 and downstream services 133 may be used for different computing operations with merchant and/or customers and their devices, such as a login operation, an authentication operation, an electronic transaction processing, a risk analysis, or a fraud detection.

As such, service applications 122 may include different ones of computing services 131 used during the provision of a particular application and/or application, such as a mobile transaction processing application (e.g., using authentication, risk and fraud, account, payment or transfer, etc., services), a web application for account login and digital wallet, a social payments application, a social media platform application, and the like. Use of computing services 131 when processing data for service applications 122 may be designated, mapped, and/or configured by an API specification of service provider system 120 and/or service applications 122, such as a request and response specification, that designates different ones of downstream services 133 for processing requests after receipt by gateway services 132 for entry to processing by computing architecture 130. The API request and response specification may designate those ones of computing services 131 handling requests and data for service applications 122, and may further designate the configurations, setups, data formats, code language and/or configuration, query parameters, and the like for usage of computing services 131. As such, the API specification may designate the particular data formats and required formatting of data when handled by different ones of computing services 131, thereby indicating how data in transformed when transmitted or transferred between different ones of gateway services 132 and/or downstream services 133.

CDT platform 134 may correspond to a digital platform, software application and/or application architecture, or the like that may include one or more processes that execute modules and associated specialized hardware of service provider system 120 to provide configuration-driven transformation of data. In this regard, service applications 122 may correspond to specialized hardware and/or software that may include an AI engine 135 that may be created and deployed for execution during run-time and/or with a live production computing environment for providing efficient data transformations through intelligent selection using an ML model 136 of transformers 137, such as during use of computing services 131 by service applications 122 for handling for data processing requests 124 and the like. As such, AI engine 135 may be used during the data transformation for requests, data loads, data objects, and the like when handled by computing services 131 and may utilize an API request and response specification to select one of transformers 137 based on corresponding data formats and transformation statistics for frameworks 138. Such data transformations may be required during the processing of data processing requests 124 for service applications 122, such as those decisions and outputs that may be provided for account services, account setup, authentication, electronic transaction processing, and other computing services.

Transformers 137 may correspond to software applications, components, and the like that transform data from one data format to another data format for use by computing services 131. In this regard, transformers 137 may be associated with frameworks 138, which may correspond to transformer configurations that each designate one or more object structures and/or data types utilized when transforming data processing requests 124, such as by transforming request coded between data formats. Frameworks 138 may include or correspond to computing code, which may be manually or intelligently generated, as discussed herein. Such computing code may include previous coding of transformers 137, and therefore, frameworks 138 may include a transformer software framework and/or software library used by transformers 137. As such, transformers 137 be setup, configured, and monitored for performance using frameworks 138, such as through performance scores, performance benchmarks, and other metrics of transformer usage, efficiency, and error rate. Selection of transformers 137 for different data formatting and data format transformation tasks may be performed by AI engine 135 using ML model 136 and/or other AI operations.

For example, and as further discussed herein, AI engine 135 may include AI models, such as ML or neural network (NN) models including ML model 136, for determination of efficient and configuration-driven data transformations through intelligent configuring and selecting of transformers 137. This may be done for transforming data processing requests 124 between different data formats during transfer or transmission between computing services 131. AI engine 135 of CDT platform 134 may be invoked by gateway services 132 when orchestrating handling of data processing requests 124, and may also be utilized during further data transformations required by downstream services 133. ML model 136 and/or other AI models of AI engine 135 may generally correspond to any artificial intelligence that performs decision-making, such as rules-based engines and the like. However, AI models may also include subcategories, including ML models and NN models that instead provide intelligent decision-making using algorithmic relationships. Generally, NN models may include deep learning models and the like, and may correspond to a subset of ML models that attempt to mimic human thinking by utilizing an assortment of different algorithms to model data through different graphs of neurons, where neurons include nodes of data representations based on the algorithms that may interconnect different nodes using mathematical relationships. ML models may encompass NNs and other models that may similarly utilize one or more mathematical algorithms to similarly generate layers, trees, clusters, and/or correlations to make intelligent decisions on input data.

When building or training ML model 136, training data may be used to generate one or more classifiers and provide recommendations, predictions, or other outputs based on those classifications and an ML model. The training data may be used to determine input features for generating predictive scores for data derivations, such as what data may be inferred or assumed from known data and/or actually available data, and what data may not be inferred or assumed. For example, ML model 136 may include one or more layers, including an input layer, a hidden layer, and an output layer having one or more nodes; however, different layers may also be utilized. As many hidden layers as necessary or appropriate may be utilized. Each node within a layer is connected to a node within an adjacent layer, where a set of input values may be used to generate one or more output scores or classifications. Within the input layer, each node may correspond to a distinct input feature, attribute, or input data type that is used to train ML model 136, where output nodes may correspond to output classifications and the like.

Thereafter, the hidden layer may be trained with these attributes and corresponding weights using an ML algorithm, computation, and/or technique. For example, each of the nodes in the hidden layer generates a representation, which may include a mathematical ML computation (or algorithm) that produces a value based on the input values of the input nodes. The ML algorithm may assign different weights to each of the data values received from the input nodes. The hidden layer nodes may include different algorithms and/or different weights assigned to the input data and may therefore produce a different value based on the input values. The values generated by the hidden layer nodes may be used by the output layer node to produce one or more output values for ML model 136 that attempt to classify or provide a predictive output from input data. Thus, when ML model 136 is used to perform a predictive analysis and output, the input may provide a corresponding output based on the classifications trained for ML model 136.

ML model 136 may be trained by using training data associated with past known and/or derived data, labels to known and derived data, such as past data transformations, efficiency and/or time taken for transformation (e.g., fastest time to perform the transformation), resource (e.g., processor and/or memory) usage or consumption by transformations, errors during transformations, and/or other data for performance scores and/or performance benchmarks to be met for transformers 137 and frameworks 138 in data transformation tasks. Training and selection may be done based on a selection weight of each of ML model 136 that are applied to different one of transformers 137 for different data transformation tasks, data objects or data structures, data types, data formats, and the like. As such, selection weights may be configured and/or adjusted during training and/or retraining based on corresponding performance scores of transformers 137 in performing tasks when selected by ML model 136.

By providing training data to train ML model 136, the nodes in the hidden layer may be trained (adjusted) such that an optimal output (e.g., a classification within an accuracy threshold) is produced in the output layer based on the training data. By continuously providing different sets of training data, and with NNs penalizing such NNs when the output of the NNs is incorrect, ML model 136 (and specifically, the representations of the nodes in the hidden layer) may be trained (adjusted) to improve its accuracy and performance in data classification. Adjusting ML model 136 may include adjusting the weights associated with each node in the hidden layer. Thus, the training data may be used as input/output data sets that allow for ML model 136 to make classifications based on input attributes. The output classifications for ML model 136 may be determinations of data that may be derived from known available data. The operations and components used to generate code for transformers 137 and select from transformers 137 by AI engine 135 are described in further detail below with regard to FIGS. 2-4B.

Service applications 122 may correspond to one or more processes to execute modules and associated specialized hardware of service provider system 120 to provide computing services for account usage, digital electronic communications, electronic transaction processing, and the like, which may invoke and/or utilize computing services 131. In this regard, service applications 122 may correspond to specialized hardware and/or software used by service provider system 120 to provide, such as to a user associated with computing device 110, one or more computing services, which in turn utilize computing services 131 and/or other microservices for decision-making during runtime. Service applications 122 may correspond to electronic transaction processing, account, messaging, social networking, media posting or sharing, microblogging, data browsing and searching, online shopping, and other services available through service provider system 120. Service applications 122 may be used by a user to establish an account and/or digital wallet, which may be accessible through one or more user interfaces, as well as view data and otherwise interact with the computing services of service provider system 120. Financial information may be stored to the account, such as account/card numbers and information. A digital token or other account for the account/wallet may be used to send and process payments, for example, through an interface provided by service provider system 120. The payment account may be accessed and/or used through a browser application and/or dedicated payment application, which may provide user interfaces for use of the computing services of service applications 122.

Service applications 122 may be accessed and/or used through a browser application and/or dedicated payment application executed by computing device 110, such as application 112 that displays UIs from service provider system 120. Such account services, account setup, authentication, electronic transaction processing, and other computing services of service applications 122 may utilize computing services 131, such as for gateway orchestration, authentication, electronic transaction processing, risk analysis, fraud detection, and the other decision-making and data processing required by the aforementioned computing services. As such, service applications 122 may handle data processing requests 124 via the computing services 131 provided on computing architecture 130.

Additionally, service provider system 120 includes database 126. Database 126 may store various identifiers associated with computing device 110. Database 126 may also store account data, including payment instruments and authentication credentials, as well as transaction processing histories and data for processed transactions. Database 126 may include or correspond to a local or distributed database, data store, and/or cloud computing storage system or nodes, which may facilitate storage of frameworks 138 and/or other data for transformers 137. As such, database 126 may be accessed and utilized during the training and/or execution of AI engine 135 for efficient data transformations during handling of data processing requests 124.

Service provider system 120 may include at least one network interface component 128 adapted to communicate computing device 110 and/or other devices and servers over network 140. In various embodiments, network interface component 128 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 140 may be implemented as a single network or a combination of multiple networks. For example, network 140 may include the Internet or one or more intranets, landline networks, wireless networks, and/or other appropriate types of networks. Thus, network 140 may correspond to small scale communication networks, such as a private or local area network, or a larger scale network, such as a wide area network or the Internet, accessible by the various components of system 100.

Figure 2:
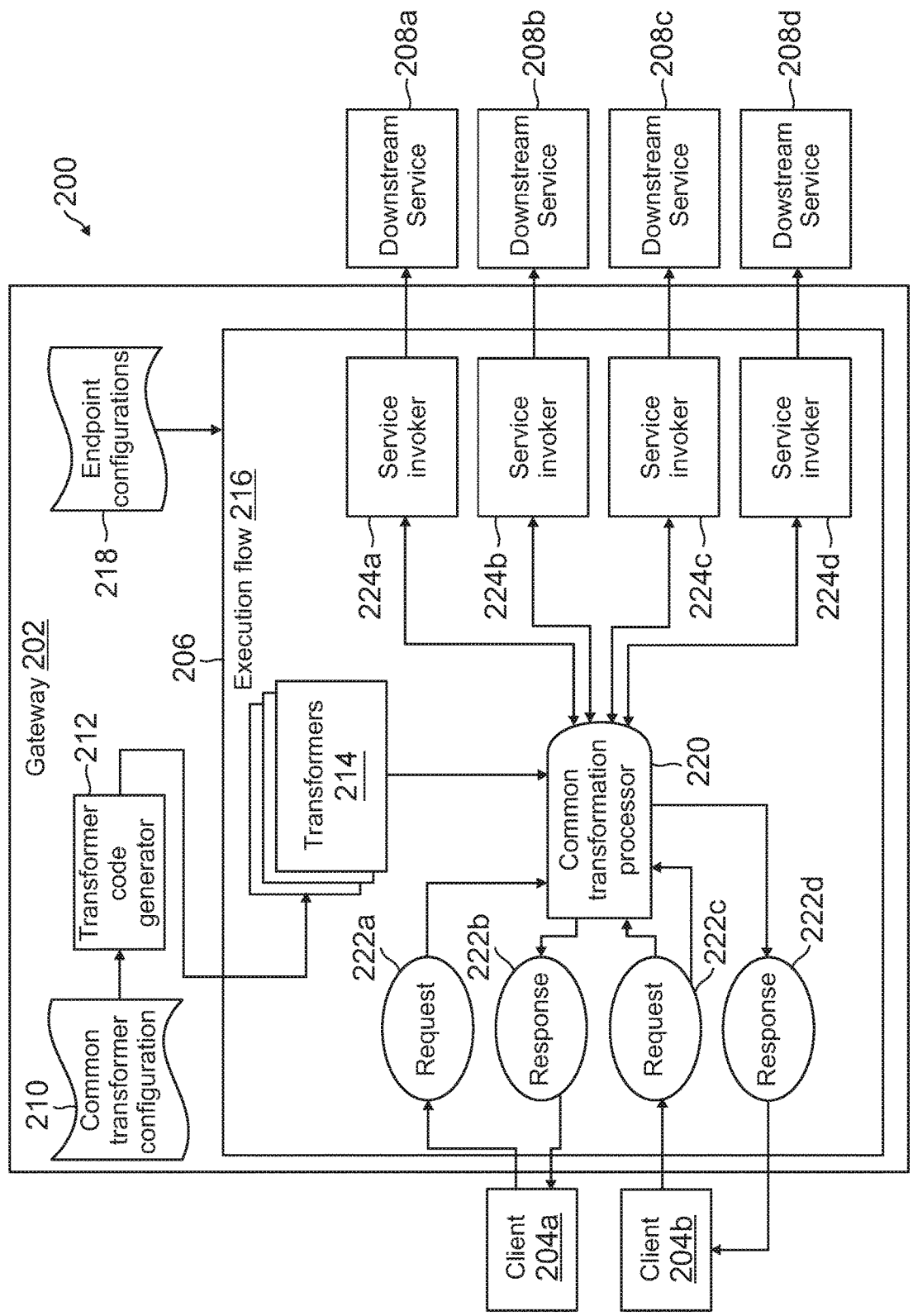
FIG. 2 is an exemplary system environment where a gateway of a service provider may transform requests from clients for downstream services, according to an embodiment.

FIG. 2 is an exemplary system environment 200 where a gateway of a service provider may transform requests from clients for downstream services, according to an embodiment. System environment 200 of FIG. 2 includes a gateway 202 that may correspond to one of gateway services 132 of computing services 131 in computing architecture 130 of service provider system 120 discussed in reference to system 100 of FIG. 1. In this regard, gateway 202 may interact with clients 204*a* and 204*b* that may correspond to a client-side application, operating system, and/or other components and operations of computing device 110, or may instead correspond to other endpoints, devices, servers, and the like that interact with service provider system 120 to request data processing (e.g., service applications 122 that may invoke gateway 202. As such, clients 204*a* and 204*b* may interact with gateway 202 to request processing of different requests and other data, which then orchestrates data processing tasks with different services and resources that include data transformations of the requests to different formats, and vice versa.

In system environment 200, on initiation of an interaction and/or request by clients 204*a* and 204*b* to gateway 202 for processing, a platform 206, such as CDT platform 134 in system 100, may be used to transform data orchestrated for coordinated data processing between different computing services including downstream services 208*a*-*d*. To do this, a common transformer configuration 210 may be used as input to a transformer code generator 212 to generate, configure, and/or update transformers 214. For example, transformer code generator 212 may correspond to a generative AI and/or trained AI model, such as ML model 136, which may intelligently generate code for transformers 214 using software libraries, data transformation frameworks, and the like from common transformer configuration 210. Common transformer configuration 210 may include an object structure, data type, or the like used when transforming data processing requests and/or for a data format handled by gateway 202 and/or downstream services 208*a*-*d*.

Further, transformer code generator 212 may utilize additional computing code from other transformers and/or similar past or currently deployed ones for transformers 214. Where other or additional computing code is used, previous coding used by a computing architecture for past data transformations and/or with transformer code libraries may be used. A transformer listener component or monitor may also be implemented to provide transformer code generator 212 with indications of past performances of transformers 214 and/or frameworks for data transformers in performing data transformations, which may include scores and metrics of past performances. This may be used when selecting a transformer having a highest performance or performance meeting or exceeding a threshold performance score or metric.

As such, code may be generated and/or configured for transformers 214 in a data repository for transformer instantiation and use based on efficient data transformations (e.g., throughput, resource usage, lowest error rate, service level agreement times, etc.). Efficient data transformations may be based on comparing to a threshold score (e.g., for the highest performance of the transformer relative to other transformers and/or performance meeting or exceeding a threshold) of the data transformations, and transformers may be selected based on a threshold similarity and/or a threshold similarity score of data transformers to each other and/or the requested task. Further, as changes are made with downstream services 208*a*-*d*, such as changes to data formats used for data handling and processing, transformer code generator 212 may update, reconfigure, and/or add to transformers 214 for new data transformations that may be required. Thereafter, transformers 214 may be deployed in an execution flow 216, which may coordinate data transformations between gateway 202 and downstream services 208*a*-*d*, which may further utilize endpoint configurations 218 to determine required data formations for downstream services 208*a*-*d* and/or further destination endpoints of requests and data from request processing.

In this regard, clients 204*a* and 204*b* may request data processing of requests 222*a*-*d*, such as by providing one or more data loads to a computing application, platform, or service using decision service 208 that requires action from a service provider. Thus, gateway 202 may be invoked in order to receive and orchestrate processing of the data processing request and provide a decision used when responding to clients 204*a* and 204*b*. Gateway 202 may act and/or be a part of an orchestration layer configured to manage data transformations for data processing of requests 222*a*-*d* with downstream services 208*a*-*d*. A common transformation processor 220 may correspond to an AI engine and/or ML model, such as ML model 136 of AI engine 135 in system 100. As such, common transformation processor 220 may be trained using similar input training data to that used by transformer code generator 212 for code generation of transformers 214. For example, the ML model of common transformation processor 220 may be trained using common transformer configuration 210 for data formats that transformers 214 are capable of handling for data transformations, transformer configurations including object structures, data types, and the like for data transformations, performance scores and other performance metrics for past performances in transforming data (e.g., amount of time taken, CPU, memory, or other computing resources used, error rate, etc.), and/or transformer availability and failure rate.

As such, when common transformation processor 220 is invoked, requests 222*a*-*d* from clients 204*a* and 204*b* may be transformed from a first or initial data format provided to gateway 202 and/or handled by gateway 202, to one or more second data formats used by downstream services 208*a*-*d* when processing data loads and/or objects from requests 222*a*-*d* (e.g., providing a service or processing result for risk, fraud detection, authentication, compliance, etc.). As such, common transformation processor 220 may use a transformer framework library or the like for transformers 214 from common transformer configuration 210 to determine the data formats required for data transformations and may perform such data transformations. Once transformed, service invokers 224*a*-*d* may be used to invoke downstream services 208*a*-*d*. For example, based on requests 222*a*, system load, and/or availability of downstream services 208*a*-*d*, different ones of service invokers 224*a*-*d* may be used to invoke the corresponding service for data processing. Thereafter, transformed data in the corresponding data format may be passed and/or transmitted to downstream services 208*a*-*d* after invoking by service invokers 224*a*-*d*.

Figure 3:
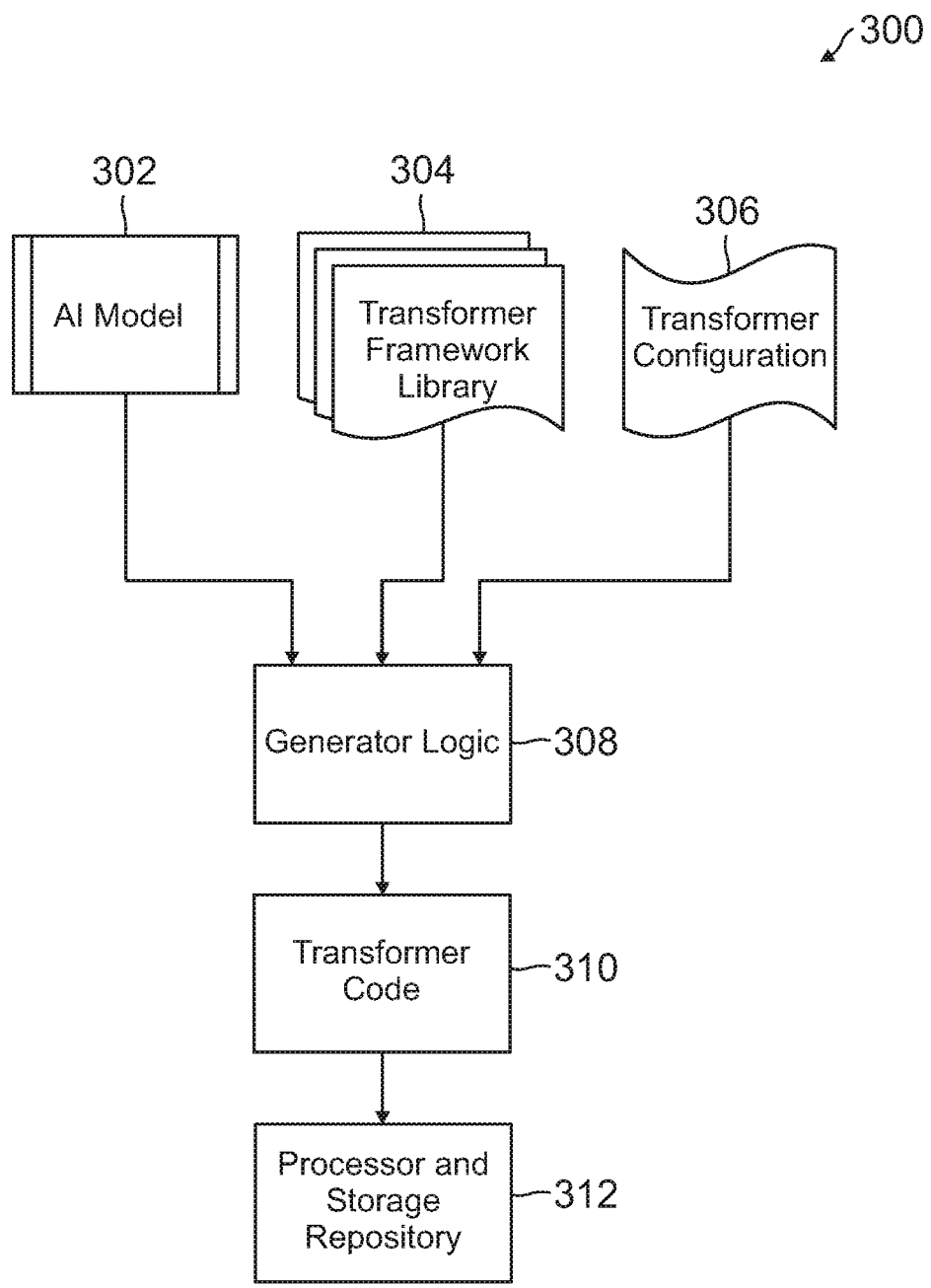
FIG. 3 is an exemplary diagram of components used to train an AI engine and system for configuration-driven efficient data transformations of requests for service orchestration, according to an embodiment.

FIG. 3 is an exemplary diagram 300 of components used to train an AI engine and system for configuration-driven efficient data transformations of requests for service orchestration, according to an embodiment. In diagram 300 of FIG. 3, creation of code for one more transformers, such as one or more of transformers 214 in system environment 200 of FIG. 2, may be performed using an AI model 302 with a transformer framework library 304 and a transformer configuration 306 for a particular type or software for transformer configuration.

In this regard, AI model 302 may correspond to a generative AI that may be used to generate computing code when provided a software library and/or computing code from transformer framework library 304 for transformers, which may be used to transform data from one data format to another data format. As such, AI model 302 may also be trained for code generation based on other data transformers and data transformation tasks that may be performed and/or requested. A generator logic 308 may utilize AI model 302 with transformer framework library 304 and transformer configuration 306 to perform the generation and configuring of transformer code, as well as update available transformers based on changes to gateway and/or downstream services, such as changes to APIs and/or processors for data formats used or handled by the different services.

The computing code may be automatically generated based on transformer configuration 306, which may designate the available data formats for request transformation including object structure, data type, and the like. As such, transformer configuration 306 may be used to determine which data formats may be translatable and the operations to translate between data formats. Generator logic 308 may output transformer code 310, which may correspond to one or more applications, transformer operations, or the like executable to transform data from one data format to another when data is received. To execute transformer code 310, the code may be stored to a processor and storage repository 312, from which the data transformer may be instantiated and utilized during data transformations.

Figure 4A:
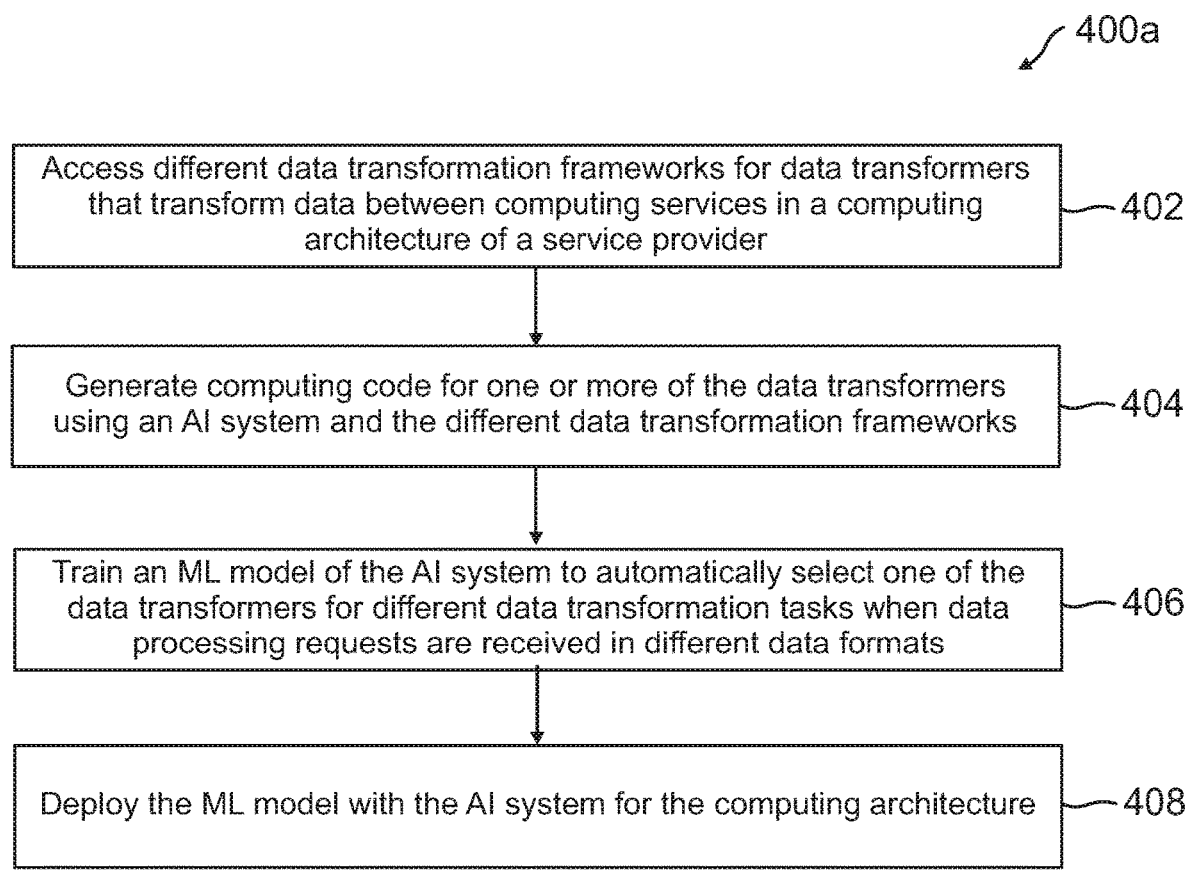
FIG. 4A is a flowchart of an exemplary process for establishing an AI engine and data transformation system for configuration-driven efficient transformation of formats and object structures, according to an embodiment.

FIG. 4A is a flowchart 400a of an exemplary process for establishing an AI engine and data transformation system for configuration-driven efficient transformation of formats and object structures, according to an embodiment. Note that one or more steps, processes, and methods described herein of flowchart 400a may be omitted, performed in a different sequence, or combined as desired or appropriate.

Flowchart 400a in FIG. 4A includes steps executed by service provider system 120, such as using CDT platform 134 of computing architecture 130 to provide training for ML model 136 for AI engine 135 to select from transformers 137 for data transformations when data is processed by different ones of computing services 131. At step 402 of flowchart 400a, different data transformation frameworks for data transformers that transform data between computing services in a computing architecture of a service provider are accessed. In this regard, frameworks 138 may be accessed that include the operations, computing code, parameters, and/or performance scores of transformers 137 when transforming or converting data from one data format to another. This may be accessed by CDT platform 134 of computing architecture 130 to determine optimal and efficient data transformations when data processing requests 124 are processed by different ones of computing services 131. As such, frameworks 138 may include and/or be utilized as training data for ML model 136, which may designate the transformer specification for object structures and data types used during data transformations. Further, an API specification, such as one for API requests and responses by different one of computing services 131, may be used to identify the data transformations required when processing different requests and/or data objects and structures. This may also indicate orchestration tasks and/or an orchestration layer provided by gateway services 132 to orchestrate and coordinate handling of data processing requests 124 by downstream services 133.

At step 404, computing code for one of more of the data transformers is generated using the AI system and the different data transformation frameworks. For example, AI engine may include components that allow for intelligent creation and/or updating of transformer code for transformers 137 in order to better, more efficiently, and/or more quickly transform data processing requests between different data formats. This may utilize a generative AI or the like and be based on past or previous computing code and/or computing structures of transformers 137, as well as the transformer specifications and the like (e.g., for object structures and/or data types handled). As such, AI engine 135 may further include a code generation component for automated code configurations of transformers 137.

At step 406, an ML model of the AI system is trained to automatically select one of the data transformers for different data transformation tasks when data processing requests are received in different data formations. When training ML model 136 for AI engine 135, data from frameworks 138 with transformers 137 may be used, as well as other data indicating performance, efficiency, and viability of transformers 137 in performing certain data transformation tasks required for data transformations when data processing requests is handled, exchanged, and transmitted between computing services 131. Training of ML model 136 may be done using an ML algorithm or other AI process such that predictive outputs of ML model 136 may select a best, most efficient, and/or least error-prone or least likelihood of transformation errors with one of transformers 137 when transforming data between computing services 131. ML model 136 may be used to select from those ones of transformers 137 that are available for the request and data processing and/or selected/orchestrated to handle the request and data processing by gateway services 132. Further, AI system 135 may utilize ML model 136 and/or other AI models and components, such as a generative AI, with a transformation code library, specification, and the like for past or current transformer code and configurations, to automatically generate code and/or code packages for additional ones of transformers 137 and/or to update configuration of transformers 137 to better or more efficiently handle data transformation tasks.

At step 408, the ML model is deployed with the AI system for the computing architecture. For example, once ML model 136 is trained, it may be deployed with AI system 135 in order to provide intelligent selection of transformers 137 during runtime and/or in a production computing environment when data processing requests 124 are received. This may allow AI engine 135 to then be used by computing services 131, such as by invoking and/or executing AI engine 135 by gateway services 132 when orchestrating handling of data processing requests 124. The process to utilize AI system 135 for intelligent and specification-driven data transformations is shown in further detail below with regard to FIG. 4B.

Figure 4B:
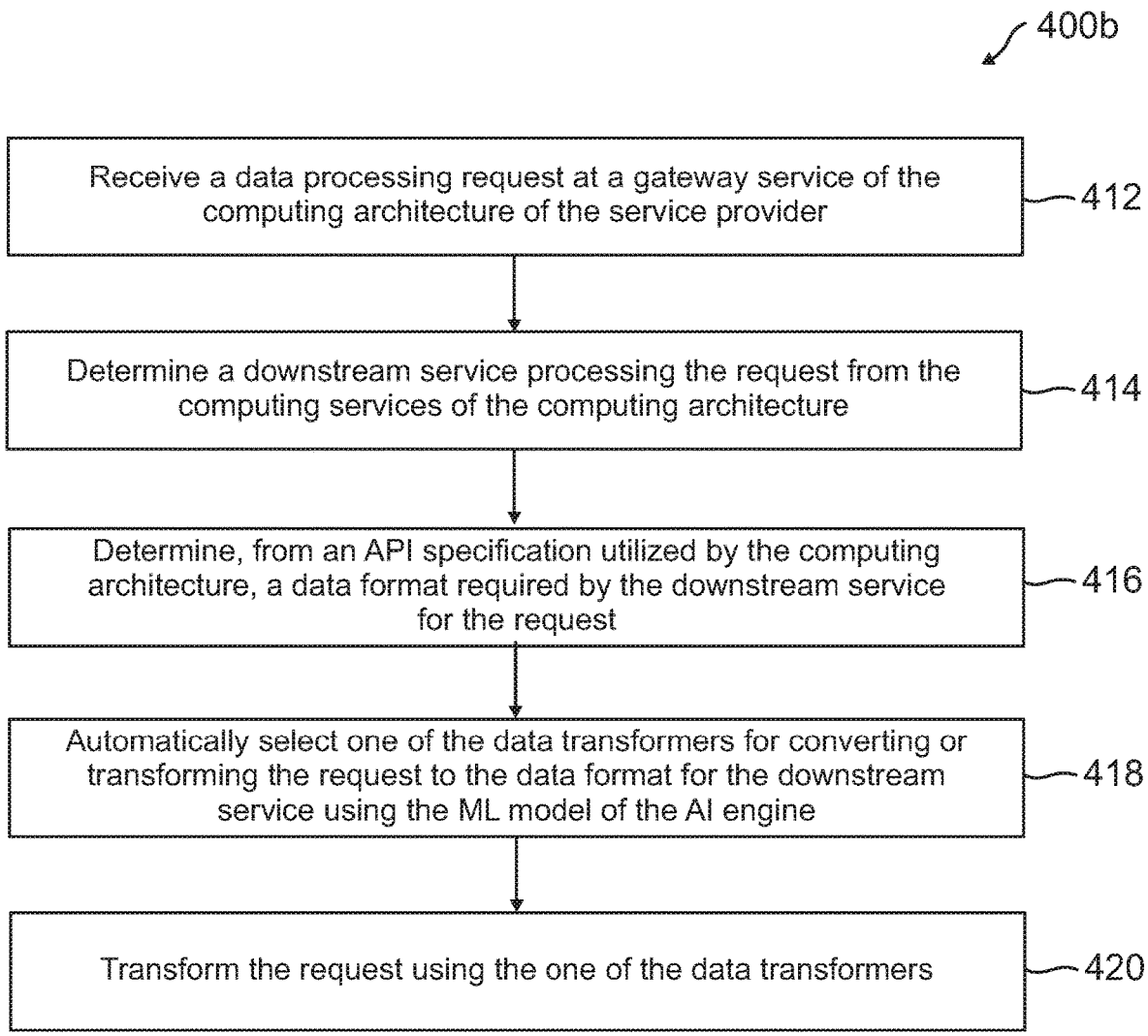
FIG. 4B is a flowchart of an exemplary process for performing configuration-driven efficient transformation of formats and object structures using an AI engine and data transformation system, according to an embodiment.

FIG. 4B is a flowchart 400b of an exemplary process for performing configuration-driven efficient transformation of formats and object structures using an AI engine and data transformation system, according to an embodiment. Note that one or more steps, processes, and methods described herein of flowchart 400b may be omitted, performed in a different sequence, or combined as desired or appropriate.

Flowchart 400b in FIG. 4B includes steps executed by service provider system 120, such as using CDT platform 134 of computing architecture 130 to provide selection of transformers 137 by AI engine 135 when transforming data between different computing services 131. At step 412 of flowchart 400b, a data processing request is received at a gateway service of the computing architecture of the service provider. For example, one of data processing requests 124 (e.g., request 114) may enter computing architecture 130, such as based on interactions by computing device 110 with service applications 122, via gateway services 132, which may act as an orchestration layer, node, or decision service that invokes one or more of downstream services 133 for handling. In this regard, request 114 may require use of different ones of downstream services 133 for processing based on the data provided to service application 122, which may require data transformation to different data formats, such as based on the object structures, data types, and the like.

At step 414, a downstream service that processes the request is determined from the computing services of the computing architecture of the service provider. Based on request 114 and/or corresponding data load or objects for processing, a strategy and/or API specification used to execute computing services 131 when invoked by service applications 122 may be determined. The API specification may designate how data is received and handled by different ones of computing services 131, which may include the data formats used when processing data by computing services 131, As such, API requests and responses exchanged between computing services 131 may be required to be formatted in a certain format for handling. The specification may be used to therefore identify how request 114 may be handled by different ones of computing services 131 in order to provide a result or output to computing device 110 by service applications 122.

At step 416, a data format is determined from an API specification utilized by the computing architecture, where the data format is required by the downstream service for the request. In this regard, the API request and response specification may further identify the different data formats used by the different ones of computing services 131 handling request 114. As such, the API specification may designate how request 114 is required to be transformed when being processed by computing services 131 of computing architecture 130. The information determined from steps 414 and 416 may be used therefore as input to AI engine 135 in the following step in order to make a predictive output, such as using ML model 136.

At step 418, one of the data transformers for converting or transforming the request to the data format for the downstream service is automatically selected using the ML model of the AI engine. In this regard, the required data format(s) for transformation of the request when handling may be provided as input to ML model 136 trained to select from transformers 137 based on a "best" one for the particular request and/or transformation task. The best selection may be based on efficiency (e.g., fastest time, processing resource usage, etc.), speed, error rate (lowest error rate or failures due to errors), or any combination thereof. ML model 136 may be trained using one or more ML algorithms, techniques, and the like, which may be configured to provide a predictive output of this best selection based on configurations of transformers 137 and other data from frameworks 138.

At step 420, the request is transformed using the one of the data transformers. Thus, once ML model 136 has made a prediction, the selected one of transformers 137 may be used for transforming the data, such as by converting the data from a first data format to a second data format utilized by the downstream service. Initially the first data format may be used by the receiving gateway service and/or converted to handling by the gateway service when orchestrating usage of downstream services 133 for handling. Thus, the transformation to the second data format may allow other ones of downstream services 133 to handle.

Figure 5:
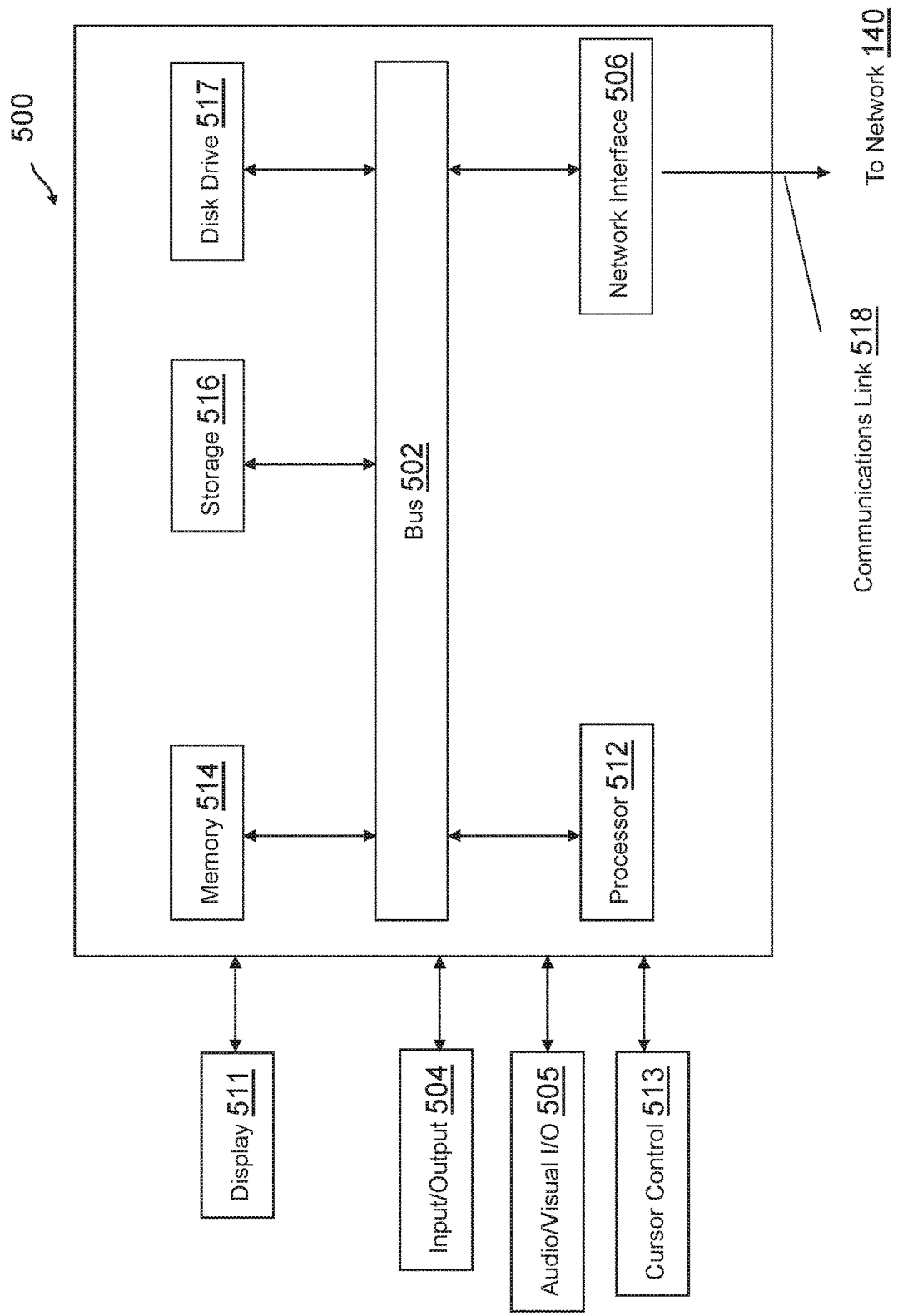
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 140. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A service provider system comprising:
a non-transitory memory; and
one or more hardware processors coupled to the non-transitory memory and configured to read instructions from the non-transitory memory to cause the service provider system to perform operations comprising:
receiving, at a gateway service of the service provider system, a data processing request in a first data format, wherein the gateway service is one of a plurality of computing services in a computing architecture of the service provider system;
determining an application programming interface (API) request and response specification utilized by the computing architecture, wherein the API request and response specification identifies subsets of the plurality of computing services used for different data processing requests and responses, and wherein the API request and response specification further identifies different ones of a plurality of data formats used by the plurality of computing services;
determining at least one second data format used by a downstream service that further processes the data processing request based on the API request and response specification;
automatically selecting, using an artificial intelligence (AI) engine of the service provider system, one of a plurality of data transformers that transforms the data processing request for the downstream service to the at least one second data format, wherein the AI engine comprises a machine learning (ML) model trained for automated selections of the plurality of data transformers based at least on past performances by the plurality of data transformers, and wherein computing code for the one of the plurality of data transformers is generated using the AI engine; and
transforming the data processing request using the one of the plurality of data transformers.

2. The service provider system of claim 1, wherein the automatically selecting, using the AI engine, is based on a transformer configuration for each of the plurality of data transformers, and wherein the transformer configuration designates an object structure and a data type utilized when transforming the data processing request.

3. The service provider system of claim 2, wherein the automatically selecting comprises:
computing a plurality of performance scores for the plurality data transformers when performing the transforming from the first data format to the second data format based at least on the transformer configurations.

4. The service provider system of claim 3, wherein, when two of the plurality of performance scores are within a threshold similarity score of each other, the operations further comprising:
transforming the data processing request by both of the plurality of data transformers corresponding to the two of the plurality of performance scores;
determining if a corresponding one of the plurality of data transformers performs better at the transforming based on at least one performance metric of the transforming; and
adjusting a selection weight of the ML model based on if the corresponding one of the plurality of data transformers performs better at the transforming.

5. The service provider system of claim 1, wherein, prior to the receiving the data processing request, the operations further comprise:
training the ML model based on the past performances, data transformation frameworks associated with the plurality of data transformers and an ML algorithm for scoring input features for output classifications of transformers; and
deploying the ML model with the AI engine.

6. The service provider system of claim 5, wherein the operations further comprise:
generating the computing code for the one of the plurality of data transformers and additional computing code for at least one other transformer of the plurality of data transformers using the AI engine.

7. The service provider system of claim 1, wherein the computing code is further generated using previous coding of one or more of the plurality of data transformers previously used by the computing architecture for past data transformations, wherein the previous coding is accessible from one or more transformer code libraries with the computing architecture.

8. The service provider system of claim 1, wherein the computing code is generated by the AI engine using a transformer configuration and a transformer software framework for the one of the plurality of data transformers, and wherein the transforming the data processing request comprises transforming first request code for the data processing request in the first data format to second request code in the second data format using an object structure and a data type used by the computing code.

9. The service provider system of claim 1, where the gateway service comprises an orchestration layer configured to manage one or more data transformations of the data processing request for at least the downstream service after receiving the data processing request at the gateway service.

10. The service provider system of claim 1, wherein, prior to the transforming, the operations further comprise:
loading data associated with the data processing request and used by the downstream service using at least one API call to a resource associated with the data,
wherein the transforming the data processing request comprises transforming the data for the downstream service using the one of the plurality of data transformers.

11. The service provider system of claim 1, wherein, prior to the receiving the data processing request, the operations further comprise:
executing a transformer listener component for data transformations by the plurality of data transformers of the computing architecture of the service provider system; and
determining the past performances using the executed transformer listener component.

12. A method comprising:
determining that a request for data processing at a gateway service of a service provider system requires a data transformation from a first data format for the request to a second data format utilized by a downstream service for processing the request, wherein the determining is based on an application programming interface (API) specification for data formats used by computing services of the service provider system;
determining a transformer framework library for a plurality of transformers that perform at least the data transformation from the first data format to the second data format;
determining, using an artificial intelligence (AI) engine comprising a machine learning (ML) model trained for automated selections of the plurality of data transformers based at least on past performances by the plurality of data transformers, performance scores for each of the plurality transformers in performing the data transformation for the request and the downstream service;
automatically selecting, by the AI engine, one of the plurality of data transformers; and
performing the data transformation using the one of the plurality of data transformers.

13. The method of claim 12, wherein the performance scores are determined using transformation specifications for the plurality of data transformers, and wherein the transformation specifications designate an object structure and a data type for input data from the request and output data for the data transformation of the request.

14. The method of claim 12, wherein the performance scores are associated with a fastest time to perform the data transformation and an error rate when performing the data transformation.

15. The method of claim 12, wherein two or more of the performance scores meet a threshold similarity or a threshold score for the automatically selecting, and wherein the automatically selecting further includes at least one other of the plurality of data transformers based on the two or more of the performance scores, and wherein the method further comprises:
after performing the data transformation by both of the plurality of data transformers selected, determining a better performing one of the plurality of data transformers based on a performance benchmark; and
weighting the better performing one of the plurality of data transformers higher in at least one subsequent data transformation.

16. The method of claim 12, further comprising:
generating computing code for the one of the plurality of data transformers using the AI engine and a plurality of transformer framework libraries associated with the plurality of data transformers.

17. The method of claim 12, wherein the API specification comprises mappings of different requests to different ones of the computing services for handling when the different requests are received at the gateway service.

18. A non-transitory machine-readable medium having stored thereon machine-readable instructions executable to cause a machine to perform operations comprising:
detecting that a data processing request in a first data format at a gateway service of a service provider system is designated for a downstream service of the service provider system;
determining that the downstream service handles the data processing request in a second data format different from the first data format based on an application programming interface (API) specification of the service provider system, wherein the API specification designates different data formats used by different computing services of the service provider system that include at least the gateway service and the downstream service;
computing, based at least on past performances by a plurality of data transformers, a plurality of performance scores for the plurality of data transformers from a transformer framework library;
automatically selecting, from the plurality of data transformers, a data transformer that can be utilized to transform the data processing request from the first data format to the second data format based on the plurality of performance scores; and
performing, using the data transformer, a data transformation of the first data format to the second data format.

19. The non-transitory machine-readable medium of claim 18, wherein the plurality of performance scores are associated with a fastest time to perform the data transformation and a lowest error rate during the data transformation, and wherein the selecting is based on a highest performance specific to transforming from the first data format to the second data format.

20. The non-transitory machine-readable medium of claim 18, wherein the different computing services are utilized by the service provider system for transaction processing electronically with devices of at least one of merchants or customers, and wherein the different computing services include at least one of a login operation, an authentication operation, an electronic transaction processing, a risk analysis, or a fraud detection.

* * * * *